(12) United States Patent
Sekihachi et al.

(10) Patent No.: US 6,218,552 B1
(45) Date of Patent: Apr. 17, 2001

(54) 3-PHENYL-7-[4-(TETRAHYDROFURFURYLOXY)PHENYL]-1,5-DIOXA-S-INDACENE-2,6-DIONE

(75) Inventors: Junichi Sekihachi, Westwood Leeds (GB); Jun Yamamoto, Toyonaka; Yasuyoshi Ueda, Kobe, both of (JP)

(73) Assignee: Sumitomo Chemical Co., Ltd., Osaka (JP)

(*) Notice: Subject to any disclaimer, the term of this patent is extended or adjusted under 35 U.S.C. 154(b) by 0 days.

(21) Appl. No.: 08/229,671

(22) Filed: Apr. 19, 1994

(30) Foreign Application Priority Data

Apr. 23, 1993 (JP) .................................................... 5-097701

(51) Int. Cl.$^7$ ................................................. C07D 307/77
(52) U.S. Cl. ............................ 549/299; 549/412; 8/636; 8/675; 8/677; 8/678; 8/115.51; 252/8.91; 252/8.7; 252/8.9; 428/364; 428/365
(58) Field of Search ..................... 549/299, 412; 8/636, 675, 677, 678, 115.51; 252/8.91, 8.7, 8.9; 428/364, 365

(56) References Cited

U.S. PATENT DOCUMENTS

| | | | |
|---|---|---|---|
| 5,286,881 | 2/1994 | Sekihachi et al. | 549/299 |
| 5,424,455 | 6/1995 | Yamamoto et al. | 549/299 |

FOREIGN PATENT DOCUMENTS

| | | |
|---|---|---|
| 146269 | 6/1985 | (EP) . |
| 397170 | 11/1990 | (EP) . |
| 436940 | 7/1991 | (EP) . |
| 0494537 | 7/1992 | (EP) . |
| 3-72571 | 2/1990 | (JP) . |
| 4164967 | 2/1990 | (JP) . |
| 372571 | 3/1991 | (JP) . |
| 4164967 | 6/1992 | (JP) . |

OTHER PUBLICATIONS

Chemische Berichte, vol. 30, 124 (1897), with translation.
Prager et al. System No. 1106/H410–411, vol. 10, Beilsteins Handbuch der Organischen Chemie and Enlarged edition thereof, 1927.
Encylopedia of Chemical Technology, vol. 24, pp. 678–708 (John Wiley & Sons, 3rd Edition, 1984).

*Primary Examiner*—Frederick Krass
(74) *Attorney, Agent, or Firm*—Pillsbury Madison & Sutro LLP

(57) ABSTRACT

A compound, 3-phenyl-7-[4-(tetrahydrofurfuryloxy)phenyl]-1,5-dioxa-s-indacene-2,6-dione, which has a structure of crystals exhibiting the strongest peak at an angle of diffraction, 2θ, of 4.7°, among peaks appearing within the range of not smaller than 3° of 2θ, in an X-ray diffraction using a Cu-Kα-ray. The compound gives dyed or printed products having deep and brilliant tint of colors with excellent fastnesses, when applied to hydrophobic fiber materials, particularly, polyester fiber materials.

10 Claims, 1 Drawing Sheet

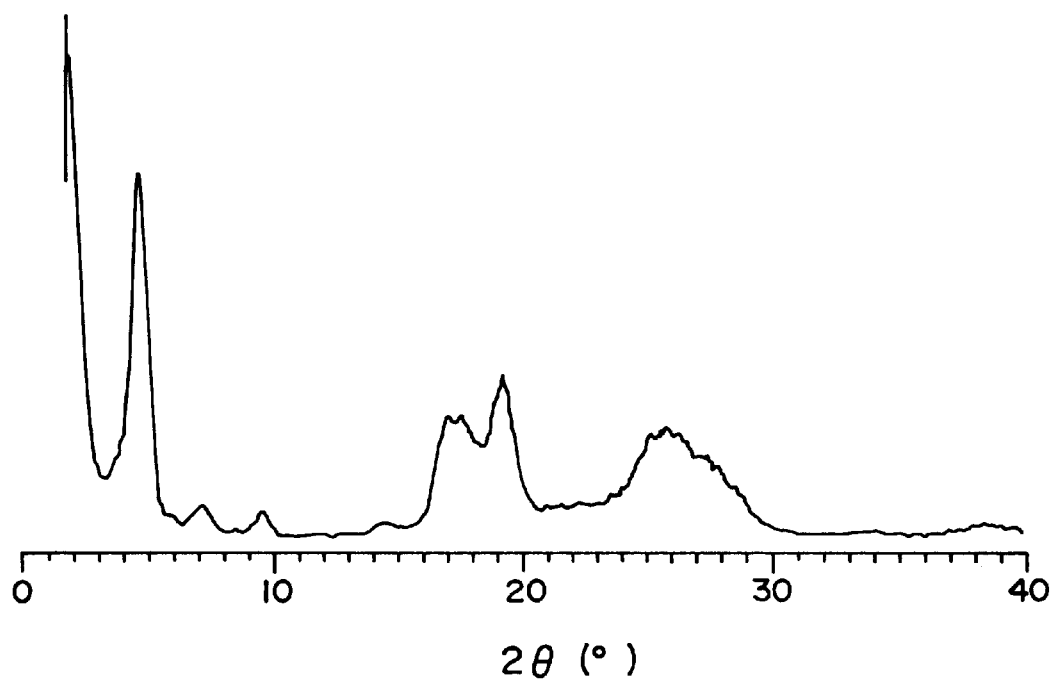

3-PHENYL-7-[4-(TETRAHYDROFURFURYLOXY)PHENYL]-1,5-DIOXA-S-INDACENE-2,6-DIONE

BACKGROUND OF THE INVENTION

The present invention relates to a compound, 3-phenyl-7-[4-(tetrahydrofurfuryloxy)-phenyl]-1,5-dioxa-s-indacene-2,6-dione, having a specific structure of crystals. More particularly, it relates to 3-phenyl-7-[4-(tetrahydrofurfuryloxy)phenyl]-1,5-dioxa-s-indacene-2,6-dione which has a structure of crystals useful for dyeing or printing hydrophobic fiber materials particularly in a deep tint of colors.

Description of the Prior Art

Japanese Patent 3-72571A (U.S. Pat. No. 5,424,455) and 4-164967A (U.S. Pat. No. 5,286,881) teach various benzodifuranone compounds. It has been known that these compounds are able to dye hydrophobic fiber materials, for example, polyester fiber materials, in red color. However, dyeabilities of these compounds are not yet sufficient to meet higher requisites sought in recent years, and a solution to this problem has been highly desired.

Summary of the Invention

The present inventors have extensively studied on dyeabilities of these benzodifuranone compounds, and accomplished the present invention based on the findings that a specific compound among them has polymorphism of crystals and a specific crystal modification of the compound endows an excellent dyeability, particularly, to give a dyed product in a deep tint of colors.

Accordingly, the present invention is to provide for 3-phenyl-7-[4-(tetrahydro-furfuryloxy)phenyl]-1,5-dioxa-s-indacene-2,6-dione having a structure of crystals which exhibits the strongest peak at an angle of diffraction, 2θ, of 4.7°, among peaks appearing within the range of not smaller than 3° of 2θ in an X-ray diffraction using a Cu-Kα -ray. Hereinafter, the crystalline structure of 3-phenyl-7-[4-(tetrahydrofurfuryloxy)-phenyl]-1,5-dioxa-s-indacene-2,6-dione which exhibits the characteristic peak as mentioned above at an angle of diffraction, 2θ, in an X-ray diffraction is referred to as "alpha-crystal modification".

The alpha-crystal modification in the present invention exhibits a characteristic sharp peak, i.e. strongest peak, at an angle of diffraction, 2θ of 4.7°, so far as 2θ is within the range of not smaller than 3°, when being subjected to an X-ray diffraction using Cu-Kα -rays. The whole X-ray diffraction pattern, particularly intensity of each peak, varies depending upon manufacturing conditions, but a typical diffraction pattern from the alpha-crystal modification when being subjected to an X-ray diffraction using a Cu-Kα -ray is as shown in the FIGURE attached. Peaks of medium strength at 17.3° and 19.2°, and peaks of weak strength at 7.1° and 9.4°, of 2θ, are also characteristics of the alpha-crystal modification.

The peaks usually appearing in an X-ray diffraction pattern using a Cu-Kα -ray from the alpha-crystal modification in the present invention are listed as follows:
Strong peak: 4.7°
Medium peaks: 17.3°, 19.2°, 26.0°, 27.0°, 27.4°
Weak peaks: 7.1°, 9.4°, 14.4°, 23.0°

BRIEF DESCRIPTION OF THE DRAWING

The FIGURE shows an X-ray diffraction pattern from the alpha-crystal modification in the present invention.

DESCRIPTION OF THE PREFERRED EMBODIMENTS

The alpha-crystal modification of 3-phenyl-7-[4-(tetrahydrofurfuryloxy)phenyl]-1,5-dioxa-s-indacene-2,6-dione of the present invention may be prepared according to the following process:

A mixture of a benzofuran compound represented by the Formula (II):

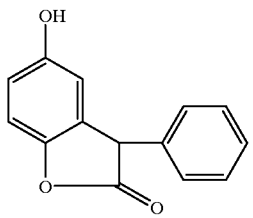

(II)

with a mandelic acid derivative represented by the Formula (III):

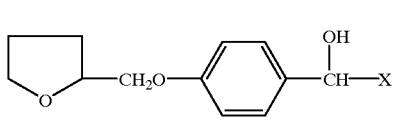

(III)

wherein X is a $COOR^1$, $CONR^2R^3$ or cyano group, in which $R^1$, $R^2$ and $R^3$ each is a hydrogen atom or an alkyl group having 1–4 carbon atoms, independently, or an acetonitrile derivative represented by the Formula (IV):

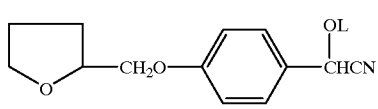

(IV)

wherein L is a $COR^4$, $COOR^5$ or $SO_2R^6$ group, in which $R^4$, $R^5$ and $R^6$ each is an alkyl group having 1–4 carbon atoms or phenyl group, independently, is heated at a temperature between 70° C. and 80° C. in monochlorobenzene. Then, the reaction mixture is subjected to an oxidation reaction at 70° C. with hydrogen peroxide. After the reaction is over, methanol is added to the reaction mixture at 40° C., and crystals formed are separated, washed with water, and dried, to obtain the present alpha-crystal modification.

Preparation of the Benzofuran Compound of Formula (II)

The benzofuran compound represented by the Formula (II) may be prepared, for example, according to a process mentioned in Japanese Patent 3-72571A referred to above. A benzofuran compound (II) can be produced in a manner analogous to the procedure described in, for example, *Chemische Berichte*, Vol. 30, 124 (1897). For instance, a madelic acid represented by the formula

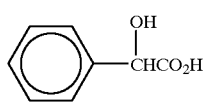

and 1,4-dihydroquinone can react with each other in 73% sulphuric acid to give compound (II).

Preparation of the mandelic acid (III)

The mandelic acid derivatives represented by the Formula (III) may also be prepared according to a process mentioned in the specification mentioned above.

More particularly, a mandelic acid of the formula (III) can be produced by analogy to the manner described in, for instance, System No. 1106/H410–411, Vol. 10 of Beilsteins Handbuch der Organischen Chemie and enlarged edition thereof. For instance, according to the description, 4-hydroxylmandelic acid of the formula

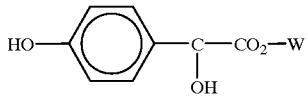

wherein W is a hydrogen atom or a $C_1$–$C_4$ alkyl group, and an alkylating agent of the formula

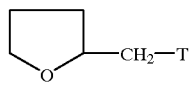

wherein T is a group capable of being split such as a halogen atom or arylsulfonyl group, can be allowed to react with each other in the presence of an acid binding agent, if necessary, followed by hydrolysis of the ester bonding.

Alternatively, a mandelic acid (III) can also be prepared by reacting a benzaldehyde of the formula

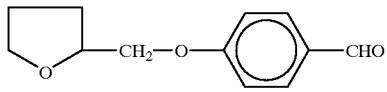

with sodium hydrogensulfite and sodium cyanide, and then hydrolyzing the resulting mandelnitrile. The hydrolysis product can be reacted with $R^1OH$, $HNR^2R^3$ or HCN to obtain a desired X group of the mandelic acid (III).

A mandelic acid (III) can also be obtained by reducing a phenylgloxylic acid of the following formula

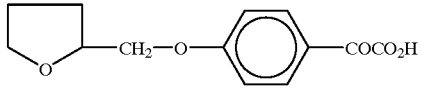

and reacting the reduction product with the desired reagent to introduce the desired X group of a mandelic acid (III).

Preparation of Acetonitrile Derivatives of Formula (IV)

The acetonitrile derivatives represented by the Formula (IV) may be prepared according to a process mentioned in Japanese Patent 4-164967A. For instance, acetonitrile compounds represented by the Formula (IV) are prepared by allowing an aldehyde compound represented by the following formula

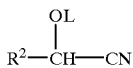

wherein L represents a $COR^4$, $COOR^5$, or $SO_2R^6$ group in which each of $R^4$, $R^5$ and $R^6$ is an alkyl group having 1 to 4 carbon atoms or a phenyl group, and $R^2$ is represented by the formula

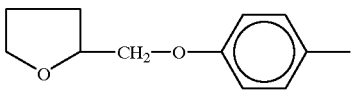

to react with metallic cyanide compounds, such as potassium cyanide, sodium cyanide and the like in the presence of acid halides represented by the formula:

L-Hal wherein Hal represents a halo group and L is as above.

In cases where X is $COOR^1$ or $CONR^2R^3$, and $R^1$, $R^2$ and/or $R^3$ is an alkyl group, in the above Formula (III), and where L is $COR^4$, $COOR^5$ or $SO_2R^6$, and $R^4$, $R^5$ and/or $R^6$ is an alkyl group, in the above Formula (IV), these alkyl groups may be substituted with a halogen atom, or an alkoxy, phenyl, alkoxyphenyl, phenoxy, hydroxy, or cyano group, etc. In case where $R^4$, $R^5$ and/or $R^6$ is a phenyl group, the phenyl group may be substituted with a halogen atom, an alkyl group having 1–4 carbon atoms, an alkoxy group having 1–4 carbon atoms, or a nitro group, etc.

As for the groups shown by X in the above Formula (III), a carboxy group; an alkoxy-carbonyl group including methoxycarbonyl; a carbonylamide group including carbamoyl; a cyano group; and the like, may be mentioned.

As for the groups shown by L in the above Formula (IV), an alkylcarbonyl group including acetyl, propionyl, butyryl, isobutyryl, valeryl, isovaleryl and pivaloyl; a benzoyl group including benzoyl, o-, m- or p-methylbenzoyl, o-, m- or p-methoxybenzoyl, and o-, m- or p-nitro-benzoyl; an alkoxycarbonyl group including methoxy-carbonyl, ethoxycarbonyl, n- or iso-propoxy- carbonyl, and n-, iso- or tert-butoxycarbonyl; a phenoxycarbonyl group including phenoxycarbonyl, p-methylphenoxycarbonyl and m-nitrophenoxycarbonyl; an alkylsulfonyl group including methylsulfonyl, ethylsulfonyl, n- or iso-propylsulfonyl, and n-, iso- or tert-butylsulfonyl; a phenylsulfonyl group including phenylsulfonyl, p-methylphenylsulfonyl and 4-methyl-2-nitrophenylsulfonyl; and the like, may be mentioned.

The alpha-crystal modification in the present invention is useful for dyeing or printing of hydrophobic fiber materials, particularly polyester fiber materials.

For example, the alpha-crystal modification is pulverized together with suitable dispersing agents such as naphthalenesulfonate-formaldehyde condensate and ligninsulfonate in an aqueous medium to form a dye dispersion of fine particles. The resulting dye dispersion may be used as it is, as a liquid product, or it may be used after spray-dried, as a powdered product.

Dyeing may be performed according to any of conventional processes. For example, into a dyeing bath containing the alpha-crystal modification dispersed in an aqueous medium containing, if necessary, pH adjusting agents, leveling agents, dispersing agents and others, is dipped hydrophobic fiber materials. In case of a polyester fiber material, for example, the dyeing may be effected under a superatmospheric pressure, normally at a temperature of not lower than 105° C., preferably at a temperature between 110° C. and 140° C. Also the dyeing may be conducted in the presence of a carrier such as o-phenyl-phenol and methylnaphthalene, at a relatively high temperature, for example, under water-boiling conditions. Furthermore, a dyeing process in which the dye dispersion is padded onto a cloth, and the padded cloth is subjected to a steaming at a temperature of 100° C. or higher, or a dry heat-treatment, may be carried out.

Printing may be performed according to any of conventional processes. For example, the dye dispersion is kneaded with suitable pasting agents, and the resulting paste is printed onto a cloth and dried, followed by steaming or dry heat-treatment.

As a matter of course, other dye or dyes may be combinedly used for dyeing or printing of the present alpha-crystal modification. Also, various adjuvants may be blended at the preparing step of the dye dispersion.

The alpha-crystal modification in the present invention gives red-dyed products with a deep and brilliant tint, having excellent fastnesses against light, sublimation and wetting, when used for the dyeing of hydrophobic fiber materials, for example, a polyester fiber material. Thus, the alpha-crystal modification according to the present invention exhibits excellent dyeabilities as red disperse dyes for hydrophobic fiber materials.

EXAMPLES

The invention will more specifically be described in regard to the following examples, which are, however, only illustrative and never construed to be limitative. All parts and percentages in the examples are by weight, except otherwise identified.

Example 1

In 33 parts of monochlorobenzene were added 3.37 parts of 1-benzoyloxy-1-(p-tetrahydro-furfuryloxyphenyl) acetonitrile, 2.26 parts of 5-hydroxy-2-oxo-3-phenyl-2,3-dihydrobenzofuran and 2.28 parts of p-toluenesulfonic acid (monohydrate). The mixture was kept warm at 80° C. for 3 hours. Then, 1.13 parts of 30% aqueous hydrogen peroxide solution was added thereto, and the mixture was kept warm at 70° C. for 1 hour for an oxidation. After the reaction was over, the mixture was cooled to 40° C. and 50 parts of methanol was added thereto. Crystals formed were separated by filtration, washed with water and dried. The crystalline product obtained was subjected to an X-ray diffraction using a Cu-Kα -ray. The X-ray diffraction pattern is shown in the FIGURE attached.

Comparative Example 1

Similar procedures as in Example 1 above were repeated, except that the oxidation was effected at a temperature of 80° C., to obtain a crystalline product.

Reference Example 1

A mixture of 1.0 part of the crystalline product obtained in Example 1 and 3.0 parts of a naphthalenesulfonate-formaldehyde condensate was finely pulverized in an aqueous medium to obtain a dye dispersion, which was then dried to obtain powdered products. Into 200 parts of a dyeing bath containing 0.6 part of the resulting powdery products was soaked 10 parts of a Tetron "Jersey" cloth (a polyester cloth manufactured by Teijin Limited) and the dyeing was effected under a superatmospheric pressure at a temperature between 130° C. and 135° C. for 60 minutes. Then, the dyed cloth was dipped in a treating solution consisting of 3 parts of sodium hydroxide, 3 parts of sodium hydrosulfite, 3 parts of a betaine-type amphoteric surface-active agent and 3,000 parts of water, and a reductive cleansing treatment was effected at 85° C. for 10 minutes. After being washed with water and drying, a dyed cloth in brilliant red color with sufficiently high color depth was obtained. The dyed cloth had excellent fastnesses against light, sublimation and wetting.

On the other hand, a similar dyeing was repeated but using 1.0 parts of the product obtained in Comparative Example 1 to obtain a dyed cloth, which had, however, a red color with a lower concentration, as compared with the above dyed cloth.

Reference Example 2

A mixture of 1.3 parts of the crystalline product obtained in Example 1 and 3.7 parts of ligninsulfonic acid was finely pulverized to form a dispersion. Thereto were added 35 parts of warm water and 60 parts of a half-emulsified paste having the following composition, in order to make a printing paste.

| | |
|---|---|
| O/W Emulsion | 300 parts |
| Maple Gum NP 12% paste (etherated locust bean gum, manufactured by Meyhall Chemical AG, Switzerland) | 694 parts |
| Sodium chlorate | 4 parts |
| Tartaric acid | 2 parts |
| Total | 1,000 parts |

A Tetron "tropical" cloth (a polyester cloth manufactured by Teijin Limited) was printed with the printing paste. After drying, the printed cloth was subjected to a steaming at 170° C. for 7 minutes by means of a high temperature steamer under atmospheric pressure for fixing. After a reductive cleansing treatment, washing with water and drying were conducted in the same way as in Comparative Example 1 above, the printed cloth was processed to softening and antistatic electrification according to a known manner. The resulting colored cloth had a brilliant red color with high color depth, and excellent fastnesses against light, sublimation and wetting.

What is claimed is:

1. A compound, 3-Phenyl-7-[4-(tetra-hydrofurfuryloxy) phenyl]-1,5-dioxa-s-indacene-2,6-dione, having a structure of crystals exhibiting the strongest peak at an angle of diffraction, 2 θ, of 4.7°, among peaks appearing within the range of not smaller than 3° of 2θ, in an X-ray diffraction using a Cu-Kα-ray.

2. The compound according to claim 1, which exhibits peaks of medium strength at 17.3° and 19.2°, and weak peaks at 7.1° and 9.4°, of angle of diffraction, 2 θ, other than the strongest peak.

3. The compound according to claim 1, which exhibits peaks of medium strength at 17.3°, 19.2°, 26.0°, 27.0° and 27.4°, and weak peaks at 7.1°, 9.4°, 14.4° and 23.0°, of angle of diffraction, 2θ, other than the strongest peak.

4. A dye dispersion comprising a compound, 3-phenyl-7-[4-(tetrahydrofurfurloxy) phenyl]-1,5-dioxa-s-indacene-2,6-dione, having a crystal structure which exhibits the strongest peak at an angle of diffraction, 2θ of 4.7°, among peaks appearing within the range of not smaller than 3° of 2θ, in an x-ray diffraction using a CuK α-ray.

5. A dye dispersion according to claim 4, wherein said compound is further characterized as exhibiting peaks of medium strength at 17.3° and 19.2°, and weak peaks at 7.1°, and 9.4°, of angle of diffraction, 2θ, other than the strongest peak.

6. A dye dispersion according to claim 4, wherein said compound has a crystal structure which exhibits peaks of medium strength at 17.3°, 19.2°, 26.0°, 27.0°, and 27.4°, and weak peaks at 7.1°, 9.4°, 14.4°, and 23.0°, of angle of diffraction, 2θ, other than the strongest peak.

7. A compound having a crystal structure which exhibits the strongest peak at an angle of diffraction, 2θ, of 4.7°, among peaks appearing within the range of not smaller than 3° of 2θ, in an x-ray diffraction using a CuK α-ray, which compound is obtained by:

heating a mixture of a benzofuran compound represented by the formula (II)

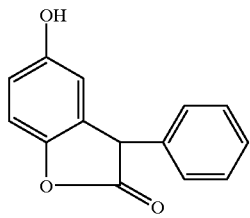

(II)

and a mandelic acid derivative represented by the formula (III)

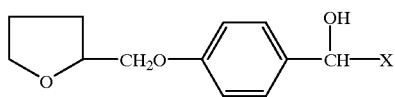

(III)

wherein formula (III) X is a $COOR^1$, $CONR^2R^3$ or cyano group, in which $R^1$, $R^2$ and $R^3$ each is independently a hydrogen atom or an alkyl group having 1–4 carbon atoms, or an acetonitrile derivative represented by the Formula (IV):

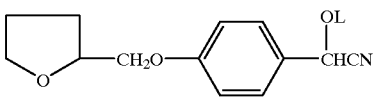

(IV)

wherein formula (IV) L is a $COR^4$, $COOR^5$ or $SO_2R^6$ group in which $R^4$, $R^4$, $R^6$ each is independently an alkyl group having 1–4 carbon atoms or a phenyl group at a temperature of 70° C. to 80° C. in monochlorobenzene to obtain a reaction mixture;

subjecting said reaction mixture to an oxidation reaction at 70° C. with hydrogen peroxide;

adding methanol to the reaction mixture after the oxidation reaction is over at a temperature of 40° C. whereby crystals of said compound are obtained; and recovering said crystals of said compound.

8. A process for dyeing a fiber which comprises applying a dye comprising a compound, 3-phenyl-7-[4-(tetrahydrofurfurloxy) phenyl]-1,5-dioxa-s-indacene-2,6-dione, having a crystal structure which exhibits the strongest peak at an angle of diffraction, 2θ, of 4.7°, among peaks appearing within the range of not smaller than 3° of 2θ, in an x-ray diffraction using a CuK α-ray to said fiber.

9. A process for dyeing a fiber according to claim 8, wherein said fiber is hydrophobic.

10. A fiber dyed with a dye comprising a compound, 3-phenyl-7-[4-(tetrahydrofurfurloxy) phenyl]-1,5-dioxa-s-indacene-2,6-dione, having a crystal structure which exhibits the strongest peak at an angle of diffraction, 2θ, of 4.7°, among peaks appearing within the range of not smaller than 3° of 2θ, in an x-ray diffraction using a CuK α-ray.

* * * * *